(No Model.)
H. W. DAVIS & D. E. GURNEY.
WARMING PAN.
No. 392,013. Patented Oct. 30, 1888.
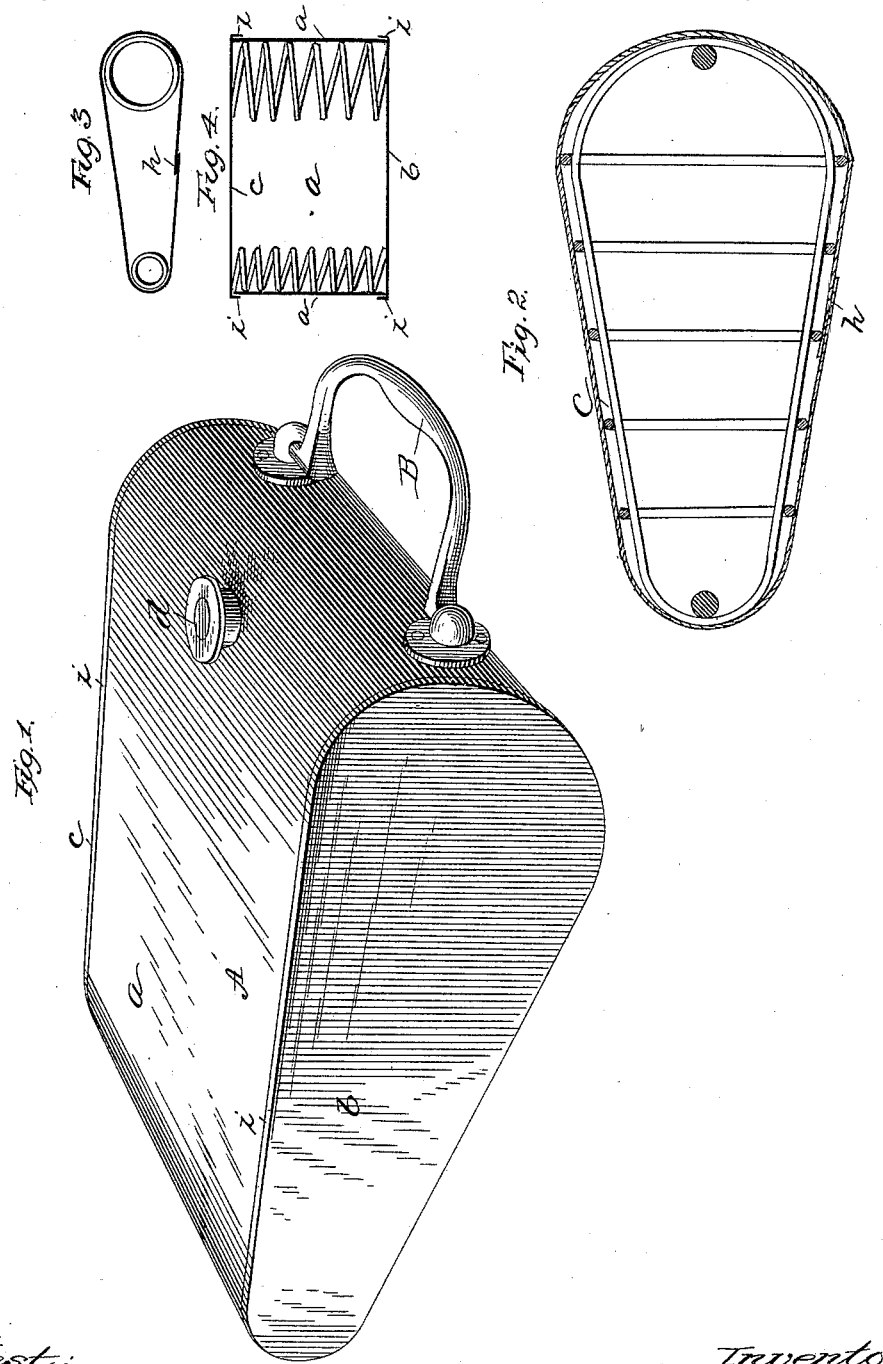
Attest:
B. C. Odell.
J. E. Middleton.
Inventors,
Herbert W. Davis.
David E. Gurney.
by Walter Donaldson & Co.
Attys.

UNITED STATES PATENT OFFICE.

HERBERT W. DAVIS AND DAVID E. GURNEY, OF FALCONER, NEW YORK.

WARMING-PAN.

SPECIFICATION forming part of Letters Patent No. 392,013, dated October 30, 1888.

Application filed January 12, 1888. Serial No. 260,491. (No model.)

*To all whom it may concern:*

Be it known that we, HERBERT W. DAVIS and DAVID E. GURNEY, of Falconer, in the county of Chautauqua and State of New York, have invented a new and useful Improvement in Warming-Pans; and we do hereby declare that the following is a full, clear, and exact description of the same.

It is the object of this invention to provide a receptacle for containing a heated fluid of special shape, adapted to afford a large heating-surface, and which, when properly positioned, will enable the person using it to utilize said heating-surface without having to place his feet or the parts to be heated into unnatural or fatiguing positions, and in connection with this form of warming-pan we aim to provide a handle of special construction and particularly positioned in relation to the peculiar form of pan for the purpose of carrying and manipulating the device, and also to prevent the heat of the stove being unduly imparted to the handle while the pan is being heated. Further, we are desirous of making the pan of such shape as, while providing a large containing-space, will also be of form suitable for resisting the pressure to which it is subjected while in use.

Our invention consists of a warming-receptacle composed of suitable material, having its upper and lower faces inclined toward each other, and thus forming a wedge-shaped pan, the ends being rounded and the sides preferably straight.

Further, it consists in a handle combined with the pan, so hinged thereto that it is allowed only an upward movement from its horizontal position, its movement toward the bottom of the pan being limited by a special form of stop.

Further, the invention consists of the peculiarly-shaped pan and the particular position of the handle thereon; and also the invention consists in the peculiar-shaped pan provided with strengthening means, and in the details of construction or particular manner of constructing the device.

In the accompanying drawings, Figure 1 is a perspective view of the pan. Fig. 2 is a section showing the strengthening-frame. Figs. 3 and 4 show two different forms of supporting means for the interior of the pan.

In the drawings, A represents the pan, and B the handle secured thereto. The pan is made of thin sheet metal, and, as shown, is composed of three pieces, *a b c*. The part *a* consists of a long sheet of metal, which is bent around to form the upper and lower faces of the pan, its ends overlapping on the bottom side, as at *h*, Fig. 2, where a firm and water-tight joint is formed. The upper and lower faces are positioned at an angle to each other, and when the pan is positioned for use, either in the bed or for a person in a sitting posture, the upper face will be inclined, and thus render it convenient and easy for the person to utilize all or part of the said surface, as he may desire, without assuming a tiresome position. Both ends of the body portion of the pan formed by the piece *a* are arch-shaped, and thus not only are sharp edges avoided by these rounded ends, but they serve to strengthen the pan and form a more suitable bearing-surface adapted to the parts.

The sides *b c* of the pan are also formed of sheet metal of wedge shape with rounded ends, and these sides are preferably flat, and are secured in place by soldering their upset edges *i* to the edges of the central portion, *a*, Figs. 1 and 4. A suitable frame, C, conforming to the wedge shape of the pan, is located within the pan and braces the upper and lower faces, whereby the strain or pressure to which the pan is subjected is resisted. Instead of the frame shown in Fig. 2, we may employ two wire coils for the same purpose, these being adapted in size to fit the larger and smaller ends of the pan and brace the same.

A filling-aperture is provided near the large end of the pan and in the upper surface, being closed by a screw-cap, *d*.

In order to carry the pan and manipulate it, a handle, B, is provided, positioned on the larger end of the pan, so that in placing the device the attendant may put it properly to the patient's feet—that is, with the small end foremost—without having to unduly disturb the bedclothes or patient, or without having to handle the heated surfaces of the pan. The handle is pivotally connected to the pan, but is limited in its movement. It is bow-shaped, and its ends are provided with bearings which enter sockets formed in ears secured to the large end of the pan. The bearing-points are located out of the plane of the handle proper, and the part of said handle adjacent to the bearings forms offset portions, which, when the handle is in horizontal position or in line with the central longitudinal dimension of the pan, bear upon the flange of the ears, and thus limit the movement, and when the handle is grasped by the hand in this position it forms practically a rigid support, and the pan can thus be carried from the stove to the bed and properly positioned. While the pan is being heated the handle may be turned up, and thus subjected to a small amount of heat. In any event it is kept from close proximity to the stove by the stops or offsets on the handle bearing against the ears. The handle may be made principally of wood or some non-conducting material.

We claim as our invention—

1. A warming-pan formed with its upper and lower faces at angles to each other, thus providing a wedge-shaped pan with an interior water-chamber, and a strengthening-frame located within the water-chamber and conforming to the walls thereof, substantially as described.

2. In combination, a warming-pan and strengthening means therefor, consisting of the wire coil or coils located within the pan, substantially as described.

3. A warming-pan formed of a body portion consisting of a sheet of metal bent around, overlapped, and secured upon itself, and the side plates secured to the edges of the body portion, substantially as described.

In testimony whereof we have signed our names to this specification in the presence of two subscribing witnesses.

HERBERT W. DAVIS.
    DAVID E. GURNEY.

Witnesses:
 NELSON H. HILL,
 GEO. R. BUTTS.